US 6,600,527 B1

(12) United States Patent
Basturk et al.

(10) Patent No.: US 6,600,527 B1
(45) Date of Patent: Jul. 29, 2003

(54) DISPLAY ASSEMBLY INCLUDING TWO SUPERPOSED DISPLAY DEVICES

(75) Inventors: Naci Basturk, Enges (CH); Joachim Grupp, Enges (CH); Beat Gilomen, Grenchen (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/581,706

(22) PCT Filed: Dec. 17, 1998

(86) PCT No.: PCT/EP98/08280

§ 371 (c)(1), (2), (4) Date: Jun. 16, 2000

(87) PCT Pub. No.: WO99/32945

PCT Pub. Date: Jul. 1, 1999

(30) Foreign Application Priority Data

Dec. 19, 1997 (CH) .......................................... 1997 2932
Dec. 22, 1997 (EP) ............................................ 97122651

(51) Int. Cl.⁷ ........................ G02F 1/1347; G04C 19/00
(52) U.S. Cl. ........................ 349/74; 349/115; 368/242; 368/84
(58) Field of Search ........................ 368/71, 84, 242; 349/115, 83, 74, 77

(56) References Cited

U.S. PATENT DOCUMENTS

| 4,088,400 A | 5/1978 | Assouline et al. |
| 4,241,339 A | 12/1980 | Ushiyama |
| 4,247,930 A | 1/1981 | Martin |
| 4,371,870 A * | 2/1983 | Biferno .......................... 345/4 |
| 4,413,915 A * | 11/1983 | Besson ........................ 368/242 |
| 4,488,818 A * | 12/1984 | Saurer et al. .................. 368/71 |
| 4,568,928 A * | 2/1986 | Biferno .......................... 345/5 |
| 5,479,278 A | 12/1995 | Takeuchi et al. |
| 5,920,256 A * | 7/1999 | Toffolo et al. ............... 340/461 |
| 6,181,301 B1 * | 1/2001 | Inoguchi et al. ................ 345/5 |

FOREIGN PATENT DOCUMENTS

GB  2 291 723  1/1996

* cited by examiner

*Primary Examiner*—Kenneth Parker
(74) *Attorney, Agent, or Firm*—Griffin & Szipl, P.C.

(57) ABSTRACT

The invention concerns a display assembly including two superposed, respectively upper (24) and lower (26) display devices, characterised in that the upper display device (24) includes a double structure formed of a display cell (28) arranged above an optical valve (30), said double structure being arranged so that said cell (28) and said valve (30) are transparent in a first state to make the lower display device visible (26), and that the cell (28) displays an item of data and that the valve (30) is opaque and masks at least partially the lower display device (26) in a second state, control means being provided for supplying a control voltage to the cell (28) and the optical valve (30) to cause them to switch from the first state to the second state and vice versa.

21 Claims, 5 Drawing Sheets

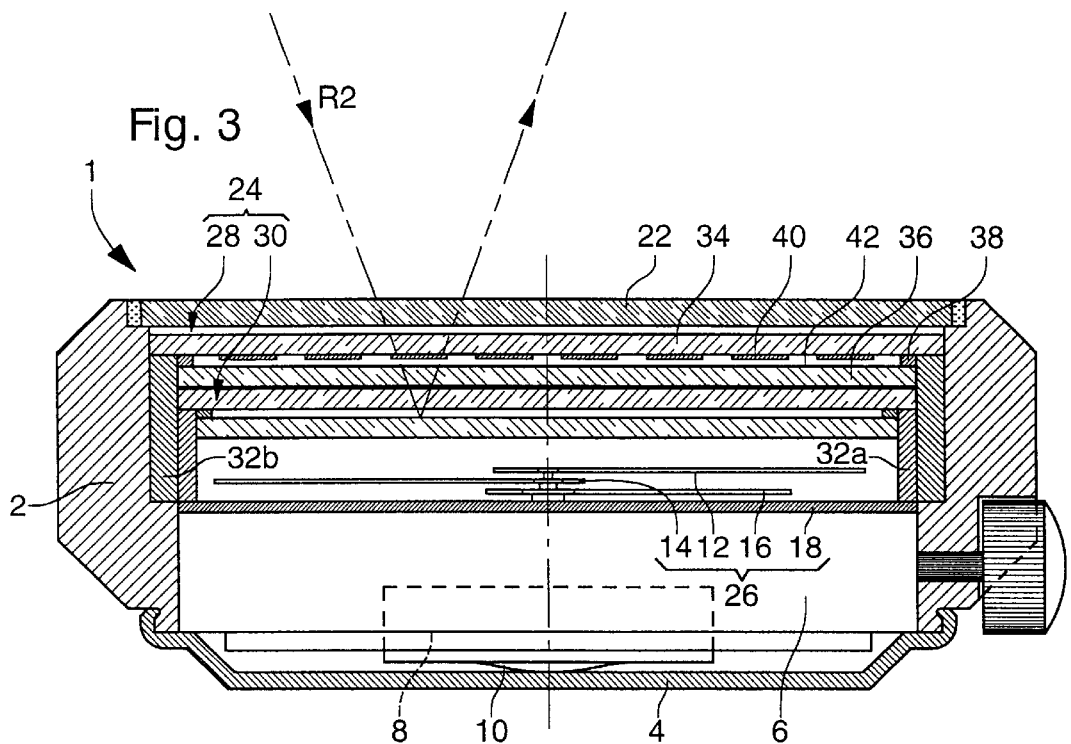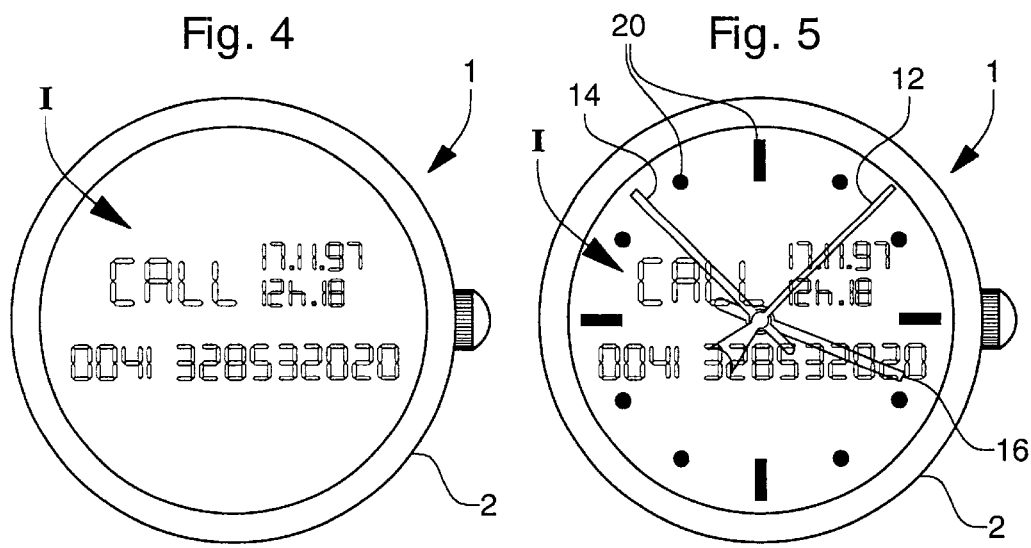

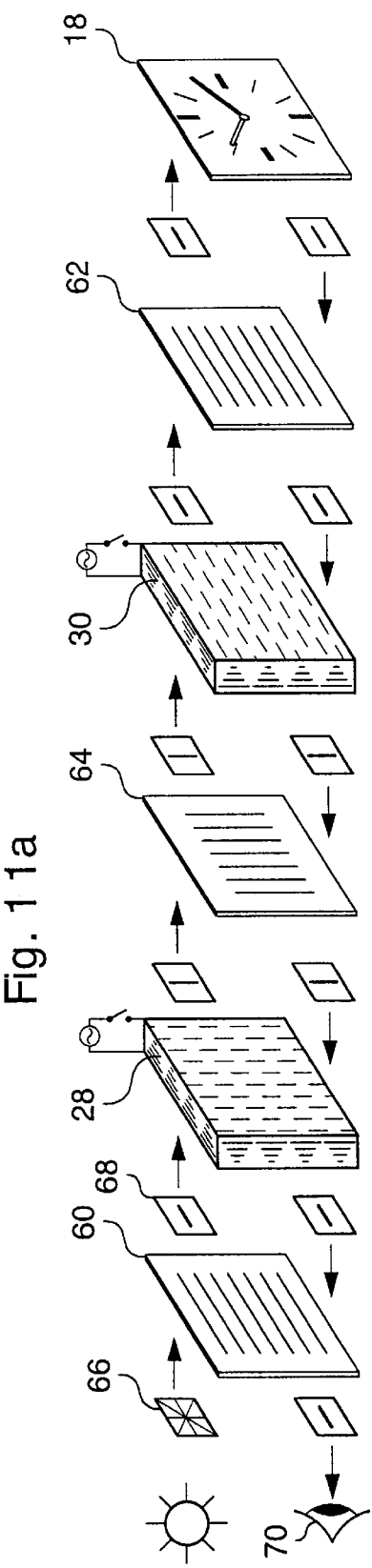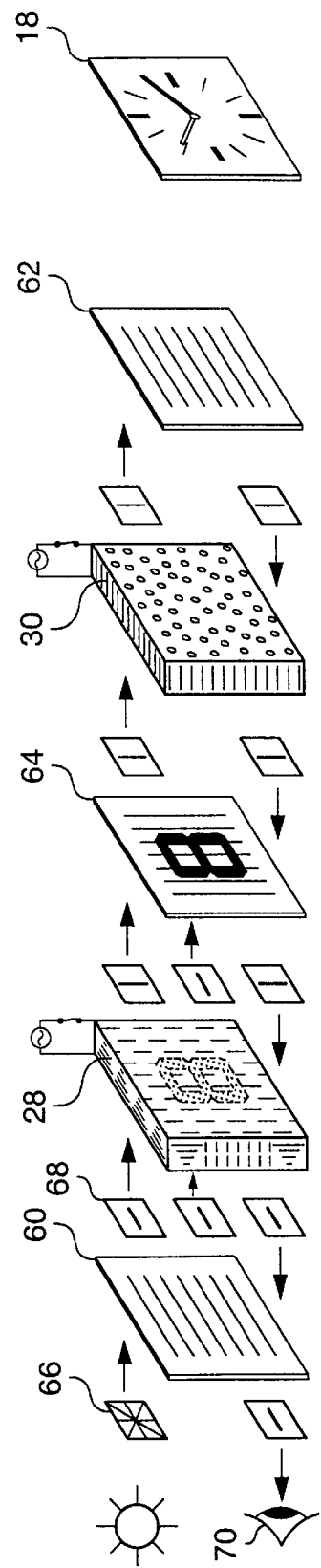

DISPLAY ASSEMBLY INCLUDING TWO SUPERPOSED DISPLAY DEVICES

The present invention concerns a display assembly including at least two superposed display devices and more particularly an assembly of this type including means allowing one of the display devices to appear selectively to an observer to the exclusion of the other.

The present invention also concerns a timepiece including a display assembly of this type and more particularly such a display assembly wherein an analogue display device is combined with a digital display device.

French Patent No. 2 462 283 already discloses an electronic watch including a case in which both an analogue display device and a digital display device are arranged. The analogue display device includes an hour hand and a minute hand which move above a dial in a conventional manner, while the digital display device includes a transparent liquid crystal cell arranged in front of the analogue display device which it completely covers. In this Patent, this cell forms the watch crystal. The digital display device allows alphanumeric characters to be displayed, for example the day of the week and the date in a dark colour on a light background or, if required, in a light colour on a dark background, the dial and the hands of the analogue display device still being visible through the digital display device. When there is no data displayed by the digital display device, the watch thus has the appearance of a conventional watch, i.e. the hands and the dial are completely visible through the transparent digital display device forming the crystal. Conversely, when data is displayed by the digital display device, this data is displayed in superposition to that of the analogue display device. This consequently makes it difficult to read the data displayed by the cell and it becomes more difficult the greater the density of data displayed by the cell. Since the current trend is to make multi-functional watches of the diary, pager type etc., in which the digital display device has to display simultaneously a large number of data, this problem is all the more critical.

The object of the present invention is to overcome the drawbacks of the aforementioned prior art by providing a display assembly including at least two superposed, respectively lower and upper, display devices, in which it is possible to make data displayed by one of the display devices appear selectively to an observer to the exclusion of the data displayed by the other, with the data displayed by the display device in question being able to be easily read.

Another object of the present invention is to provide a display assembly wherein the upper display device is a liquid crystal display device having an improved display contrast.

A further object of the present invention is to provide a timepiece fitted with such a display assembly, having an improved aesthetic appearance.

The invention therefore concerns a display assembly including two superposed, respectively lower and upper, display devices, characterised in that the upper display device includes a double structure formed of a display cell arranged above an optical valve, said double structure being arranged so that said cell and said valve are transparent in a first state so as to make the lower display device visible, and that the cell displays an item of data and that the valve is opaque and reflective and at least partially masks the lower display device in a second state, control means supplying a control voltage to cause the display cell and the optical valve to pass from the first state to the second state and vice versa.

As a result of these features, it is possible to use either the lower display device or the upper display device selectively, without one altering the quality and legibility of the other's display. In particular, if one chooses to use the lower display device, the upper display device can be switched into its first state in which it is totally transparent, so that the data displayed by the lower display device is perfectly visible. If, conversely, one chooses to use the upper display, the optical valve is then switched into the second state in which it becomes opaque and reflective to mask the lower display device totally, while the cell of the upper display device can display the desired data. This data can be displayed in a light colour on a dark background or in a dark colour on a light background as a function of the type of display cell used. In this way, any difficulty in reading the data resulting from the superposition of the lower and upper display devices is removed, which particularly improves the ability of the data displayed by the display device chosen to be read.

According to a first embodiment, the optical valve includes a twisted nematic type cell provided with a polariser placed in front of the cell, and a quarter-wave plate associated with a cholesteric film placed in succession behind the cell, the optical valve or the lower display device further including a second quarter-wave plate placed behind the cholesteric film and the lower display device including a metal reflector placed behind said second quarter-wave plate.

The passage of light through the second quarter-wave plate allows the circular polarised light, exiting the cholesteric film, to be converted into linear polarised light for which the metal reflector is more efficient. This structure allows the light reflected by the display assembly to be homogenised and the colour thereof to be less dependent on the wavelength of the light.

According to a second embodiment, the optical valve includes a twisted nematic type cell provided with a polariser placed in front of the cell, and a quarter-wave plate associated with a cholesteric film having a first helical direction, placed in succession behind the cell, the lower display device including a cholesteric mirror having an opposite helical direction to that of said cholesteric film.

As a result of this structure, the whole of the light passing through the cholesteric film, which represents half of the incident light, is reflected by the cholesteric mirror, which improves the brilliance of the display assembly. In the case of a wristwatch or suchlike, the cholesteric mirror can advantageously form the watch dial. Another advantage of this structure lies in the fact that one can choose cholesteric mirrors of different colours, which allows coloured display assemblies to be made.

According to a third embodiment, the optical valve includes a twisted nematic type cell provided with a polariser placed in front of the cell, and a quarter-wave plate associated with a cholesteric film placed in succession behind the cell, the lower display device further including a half-wave plate ($\lambda$2) and a second cholesteric film identical to the first.

As a result of this structure, two identical optical elements associated with the display cell can be used, which constitutes an advantage from the practical point of view.

According to an advantageous embodiment, the display cell and the optical valve are in a transparent state in the absence of voltage applied by the control means. Thus the data displayed by the lower display device is permanently visible without the upper display device consuming power. This is particularly advantageous within the scope of an application to a portable object such as a wristwatch.

Other features and advantages of the present invention will appear in the following description of a preferred embodiment, presented by way of non-limiting example with reference to the annexed drawings, in which:

FIGS. 3 and 4 are similar views respectively to those of FIGS. 1 and 2, the display device being switched into a second state;

FIG. 5 is a top view of a wristwatch in a particular switching mode of the display assembly according to the invention;

FIGS. 11a, 11b and 12a, 12b are schematic views of twisted nematic type liquid crystal display cells.

Figure 1:
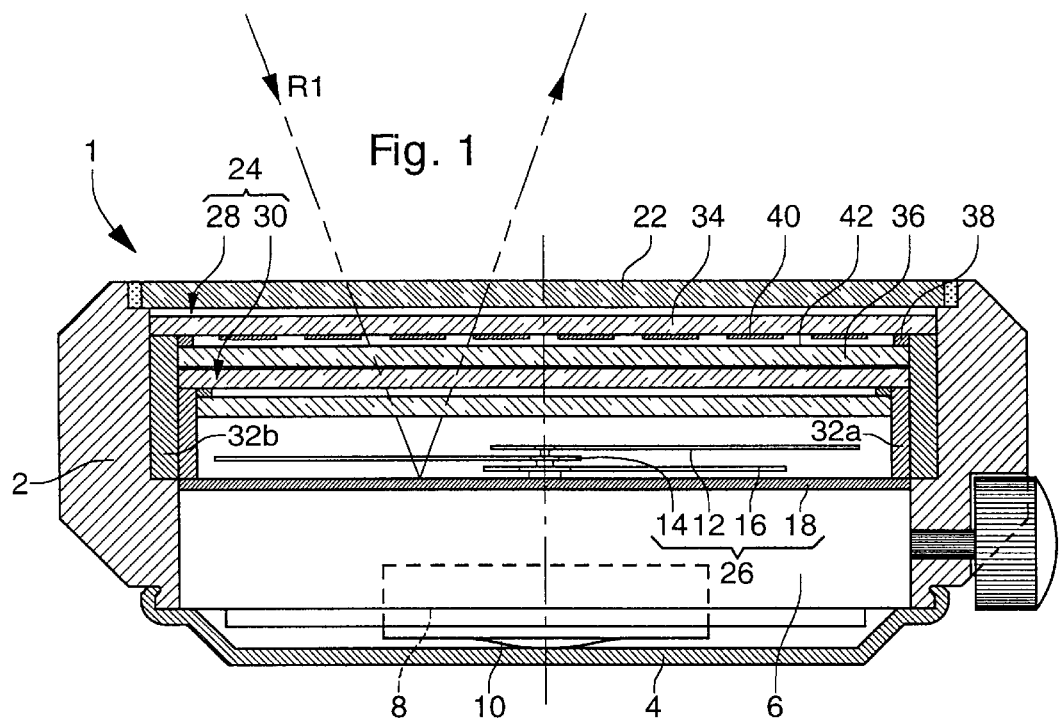
FIG. 1 is a cross-section of a wristwatch fitted with a display assembly according to the present invention, the assembly state being switched into a first state allowing the lower display device to appear.

The description of the invention will be made within the scope of an application to a timepiece such as a wristwatch. However, it goes without saying for those skilled in the art that the invention is not limited to this application and that it could advantageously be used within the scope of any other application requiring the display of data such as advertising boardings, measuring instruments, etc.

Referring to FIGS. 1 to 4, a timepiece of the wristwatch type is shown, designated by the general reference 1. This watch 1 includes, in a conventional manner, a case 2 fitted with a back cover 4 in which are arranged an electronic clockwork movement 6 and a battery 8 which rests on back cover 4 via a contact spring 10. Movement 6 includes electronic time-keeping circuits, associated, via a control circuit, with a drive device (not shown) for a second hand 12, a minute hand 14, and an hour hand 16 which move above a dial 18 which carries hour-symbols 20 which are visible in FIG. 2. Case 2 is also closed in a conventional manner by a crystal 22 which covers the whole of dial 18.

According to the invention, watch 1 further includes a display assembly including two superposed display devices, respectively upper device 24 and lower device 26. In the example shown, lower display device 26 includes display means of time related information, in particular analogue time display means formed by hands 12, 14, 16 and dial 18.

It goes without saying that lower display device 26 could be formed by any digital display device, for example of the liquid crystal type. This display device 26 could also include a combination of analogue and digital display means such as the combination disclosed in European Patent No. EP-B-0 078 237 in the name of the Applicant or a decorative element, for example a picture, figure, etc.

According to the invention, upper display device 24 includes a double structure formed of a display cell 28, arranged above an optical valve 30, this display device 24 extending between lower display device 26 and crystal 22. In the example shown, this upper display device 24 covers the whole of the surface of dial 28.

Figure 2:
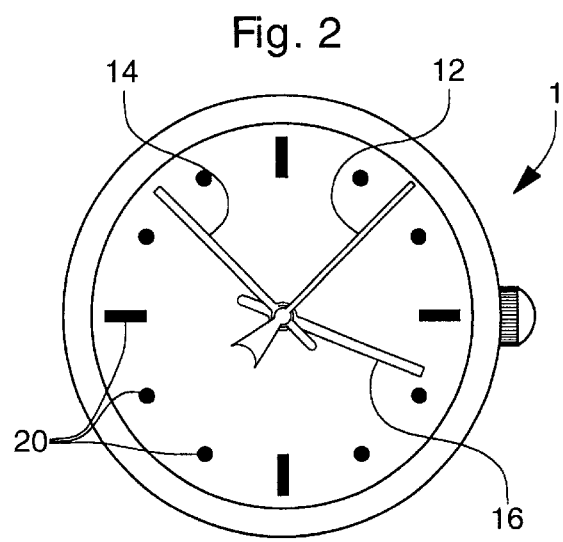
FIG. 2 is a top view of the wristwatch shown in FIG. 1, the display assembly being in the same switched state as in FIG. 1.

According to the invention, upper display device 24 is arranged on the one hand so that display cell 28, which is arranged between crystal 22 and optical valve 30, and the latter are transparent in a first switching state of cell 28 and valve 30, so as to make the data displayed by lower display device 26, i.e. hands 12, 14 and 16 and dial 18 in the example shown, visible. Such a configuration of the display assembly according to the invention is shown in FIG. 2.

On the other hand, upper display device 24 is arranged so that display cell 28 displays an item of data, for example of the alphanumeric type, and so that optical valve 30 is opaque and masks at least partially lower display device 26 in a second switching state.

The switching of display cell 28 and optical valve 30 from the first state to the second state and conversely is achieved by control means (not shown) integrated in movement 6, these control means being connected to cell 28 and to valve 30 by means of conventional connectors 32a, 32b, to supply them with a control voltage. In the example shown, these connectors 32a and 32b also form a flange arranged between the upper edge of dial 18 and the lower edge of optical valve 30 and of cell 28 respectively.

According to a particular embodiment of the invention shown in FIGS. 1 to 4, cell 28 is a display cell of the liquid crystal type. The cell includes a transparent front substrate 34, a transparent back substrate 36, a sealing frame 38 forming spacing and closing means and delimiting with substrates 34 and 36 a closed cavity in which is situated a layer of liquid crystals. The facing faces of substrates 34 and 36 include transparent electrodes 40, 42, made for example of indium/tin oxide. In the example illustrated, front substrate 34 carries electrodes configured in digits each formed of segments allowing the alphanumeric characters to be displayed, while back substrate 36 carries an electrode extending over its entire surface. Electrodes 40 and 42 are connected to connector 32a via contact areas 44 situated outside the cavity.

When a voltage is applied or removed across electrode 42 and certain of electrodes 40, the liquid crystals situated between these electrodes 42 and 40 are switched alternately from an absorbent state to a transparent state or conversely, according to the type of liquid crystal in question and/or the presence and arrangement of polarisers associated with the cell. It is thus possible to display data in a light colour on a dark background or in a dark colour on a light background.

In the example shown, display cell 28 is a liquid crystal cell of the twisted nematic type whose respective external surfaces of substrates 34 and 36 are provided with crossed polarisers (not shown). Thus, cell 28 is totally transparent (FIGS. 1 and 2), i.e. in the first switching state, when no voltage is applied across the terminals of its electrodes 40, 42 (non switched state), and absorbing or diffusing (FIGS. 3 and 4) in the second switching state, when a voltage is applied across the terminals of its electrodes 40, 42 (switched state).

According to an embodiment which is not shown, the orientation of the polarisers is parallel, so that the cell is transparent in its switched state and absorbent in its non switched state.

It goes without saying that cell 28 can be of another type as long as the cell is transparent in a first switching state, and absorbent or diffusive in a second switching state.

One could, in particular, choose STN or Guest-Host (GH) type LCD cells or LCD cells having electrically controlled birefringence (ECB) or cells of the nematic gel and cholesteric texture, liquid crystals nematic or ferroelectric dispersed in a polymer, or dynamic scattering type.

The structure and the operation of these types of cells are well known to those skilled in the art and will not be described in detail in this description.

For a complete description of the structure and operation of an STN type cell, reference will be made for example to European Patent No. EP-A-0 131 216 which is incorporated here by reference.

For a complete description of the structure and operation of a GH type cell, reference will be made for example for a positive contrast GH cell, i.e. which displays in a dark colour on a light background, to U.S. Pat. No. 4,257,682 which is incorporated here by reference and for a negative contrast GH cell, i.e. which displays in a light colour on a dark background, to the publication by G. H. Heilmeier and L. A. Zanomi entitled <<Guest-Host Interaction in Nematic Liquid Crystals a New Electrooptical Effect >> published in Appl. Phys. Lett. vol. 13, No. 3, pages 91–92, 1968.

For a complete description of the structure and operation of a ECB type cell, reference will be made for example to volume 3 of the work entitled <<Liquid Crystals Applications and Uses >> edited by B. Bahadur at pages 254–300 which is incorporated here by reference.

For a complete description of the structure and operation of nematic gel and cholesteric texture type cell, reference will be made for example to U.S. Pat. No. 5,188,760 and European Patent No. EP-A-0 451 905 which are incorporated here by reference.

For a complete description of the structure and operation of a polymer dispersed liquid crystal cell, reference will be made for example to U.S. Pat. No. 4,435, 047 which is incorporated here by reference.

It will be noted in this regard that a reverse PDLC cell will be chosen if one wishes to obtain a cell which is transparent in the non switched state, and opaque and reflective in the switched state.

For a complete description of the structure and operation of a dynamic scattering type cell, reference will be made for example to volume 1 of the work entitled <<Liquid Crystals Applications and Uses >> edited by B. Badahur at pages 196–227 which is incorporated here by reference.

For a complete description of the structure and operation of a ferroelectric type cell, reference will be made for example to volume 1 of the work entitled <<Liquid Crystals Applications and Uses >> edited by B. Badahur at pages 307–356 which is incorporated here by reference.

All the types of cell 28 described hereinbefore can of course be passively addressed by a matrix of electrodes or even actively addressed by non linear elements such as thin layers transistors MIM or diodes.

In the example shown, optical valve 30 is formed of an electrolytic cell which is transparent in the non switched state (FIGS. 1 and 2), and which is opaque and reflective in the switched state (FIGS. 3 and 4). Such a valve 30 includes an electrolytic solution of a metal salt dissolved in a solvent placed between two electrodes. When valve 30 is in a switched state, the metal of the solution is deposited over the entire surface of one of the electrodes, and thus makes valve 30 reflective. When valve 30 is in a non switched state, the metal dissolves again in the solution, and the cell becomes transparent again. Such a valve 30 is for example described in the publication by J. Duchêne et al. entitled <<Electrolytic Display >>, published in SID 1978 pages 34 to 37 which is incorporated here by reference.

Of course, according to an alternative embodiment, optical valve 30 can be formed by an electrocapillary mercury cell including a capillary cell arranged between two substrates carrying electrodes, and which, in the cell's switched state, does not wet the surface of the substrates, so that the cell is transparent, and which, in the cell's non switched state, wets the entire surface of the substrates to make the cell reflective. Such a cell is for example described in U.S. Pat. No. 4,583,824 which is incorporated here by reference.

Figure 6:
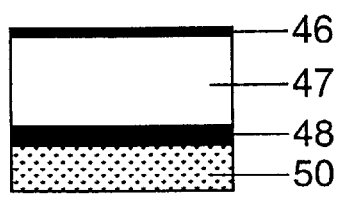
FIG. 6 is a schematic view of an embodiment of the optical valve.

According to another alternative embodiment shown in FIG. 6, optical valve 30 can be formed by a switchable reflector including, starting from the side of crystal 22, a stack formed of a linear polariser 46, a liquid crystal cell 47 of the twisted nematic type (TN), a quarter-wave plate 48 and a cholesteric film 50 such as the reflector described in the publication by T. J. Scheffer entitled <<Twisted Nematic Display with Cholesteric Reflector <<published in J. Phys. Appl. Phy., Vol. 8, 1975 which is incorporated here by reference. Preferably, polariser 46 is of a type having a high level of polarisation and transmission efficiency for example such as the polariser marketed by the Sanritsu company, Japan under the reference $LLC_25618SF$.

In the following description, those elements which are identical to those described in connection with FIG. 1 are designated by the same numerical references.

Figure 7:
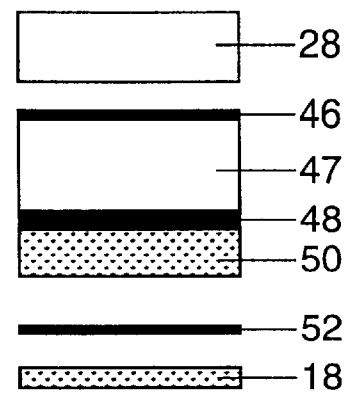
FIGS. 7 to 10 show schematic views of different embodiments of the display device according to the invention.

With reference now to FIG. 7, a first embodiment of the display assembly according to the invention is shown. According to this embodiment, upper display device 24 further includes a second quarter-wave plate 52 placed immediately behind cholesteric film 50, and lower display device 26 includes a dial 18 forming a metal reflector. By way of example, the visible face of dial 18 can include a reflective metal layer if dial 18 is not made of metal, or this face can be mirror-polished if dial 18 is metal. It will be noted that it is also possible to integrate second quarter-wave plate 52 directly in dial 18.

Figure 8:
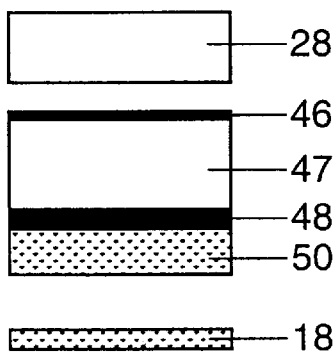

With reference now to FIG. 8, a second embodiment of the display assembly according to the invention is shown. According to this embodiment, lower display device 26 includes a dial 18 forming a cholesteric mirror having an opposite helical direction to that of said cholesteric film 50 of upper display device 24.

Figure 9:
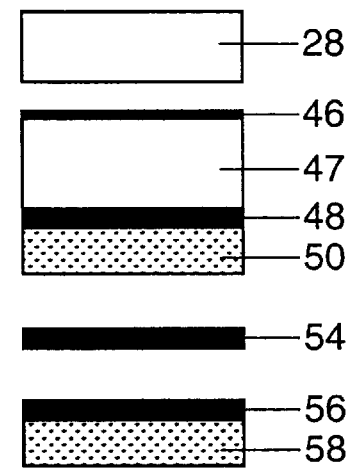

With reference now to FIG. 9, a third alternative embodiment of the display assembly according to the invention is shown. According to this alternative, lower display device 26 further includes a second and a third quarter-wave plate 54, 56 and a second cholesteric film 58 replacing dial 18.

Figure 10:
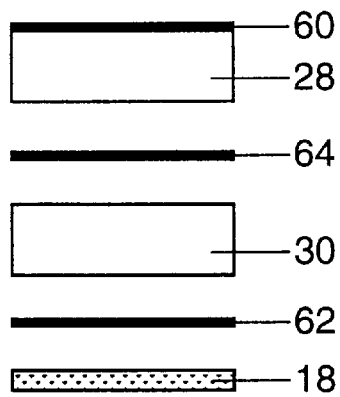

According to another alternative shown in FIG. 10, cell 28 can include on the side of crystal 22, a linear polariser 60 and, on the side of dial 18, a reflective polariser 62, which may or may not be associated with a linear polariser 64 placed in front of it in the place of quarter-wave plate 48 and cholesteric polariser film 50.

In an advantageous manner, the reflective polariser can be of the $\mu$-prism type such as, for example, the product marketed under the name DBEF (Dual Brightness Enhancement Films) by the 3M company. Other films used for improving the brightness of the system such as the BEF (Brightness Enhancement Films) produced by the 3M company may or may not be associated with the aforecited DBEF film. If required, the reflective polariser described hereinbefore could be replaced by a transflective polariser such as for example the product marketed under the name TDF by the 3M company. The quarter-wave plate and the cholesteric film could also be integrated in a single element, for example such as the product TRANSMAX® marketed by Merck.

In a first state shown in FIG. 11a, display cell 28 is formed of a positive dielectric anisotropy twisted nematic (TN) liquid crystal cell placed between two crossed linear polarisers 60, 64. Likewise, valve 30 is a positive dielectric anisotropy TN cell associated with a reflective polariser 62 oriented so that its axis of polarisation is perpendicular to the axis of polarisation of linear polariser 64 which is placed in front of it. Thus, dial 18 is visible when display cell 28 and optical valve 30 are in the non switched state. As is seen in FIG. 11a, the natural non polarised light, designated by the numerical reference 66, is polarised horizontally by first linear polariser 60. The direction of polarisation of the light, designated by the reference 68 is then rotated by 90° when it passes through display cell 28, then it passes without modification through linear polariser 64. Direction of polarisation of the light 68 is then again rotated by 90° when it passes through optical valve 30, so that this component of the light is transmitted by reflective polariser 62 to dial 18. The light follows the same path during its return travel, so that dial 18 is visible to an observer 70. Conversely, when cell 28 and valve 30 are in the switched state (FIG. 11*b*), dial 18 is masked. In this second switched state, cell 28 is absorbent in its switched regions, i.e. in the zones in which electrodes 40 and 42 are switched, whereas valve 30 is totally reflective. As is seen in FIG. 11*b*, the horizontally polarised light which passes through cell 28 in the switched zones thereof is not modified, so that it is absorbed by linear polariser 64 whose axis of polarisation is vertical. Likewise, the direction of polarisation of the light which passes through cell 28 outside its switched zones is not modified during its passage through valve 30, so that it is totally reflected by reflective polariser 62. The data is thus displayed in opaque on a reflective background, the appearance of the display being determined by the colour reflected by reflective polariser 62. FIG. 11*b* also shows that the addressing of cell 28 is normal, i.e. the switched segments thereof are those which it is sought to display. According to an alternative which is not shown in the drawings, the addressing of display cell 28 can be reversed, i.e. all the segments of said cell 28 are switched, to the exclusion of those which it is sought to display. In this case, the data is displayed by a transparent portions of the cell on an opaque background, the appearance of the display being, here also, determined by the colour reflected by reflective polariser 62 and the colour of dial 18.

Figure 12A:
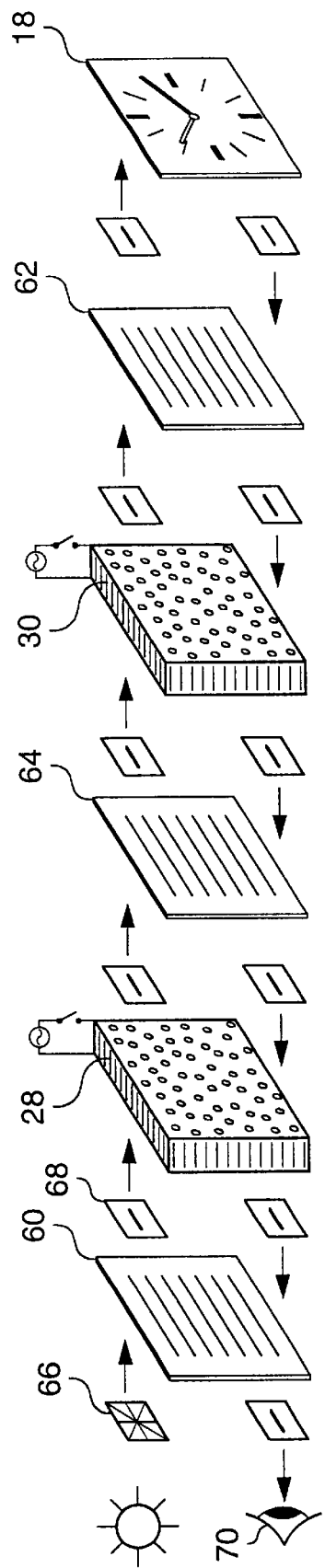
Figure 12B:
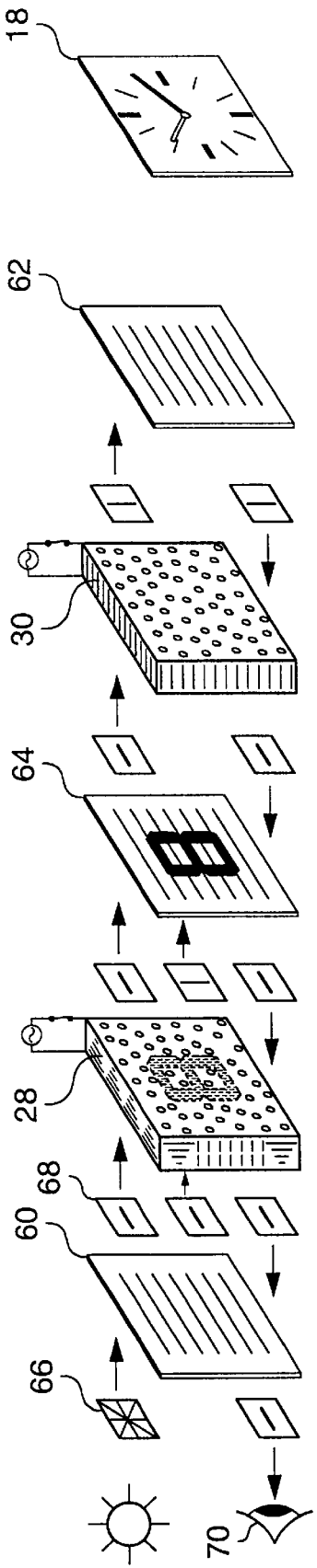

In a second state shown in FIG. 12*a*, display cell 28 and optical valve 30 are each formed of a negative anisotropy twisted nematic liquid crystal cell. The alignment of the liquid crystal molecules is thus homeotropic in the non switched state of said cells, so that display cell 28 and optical valve 30 have no effect on the direction of polarisation of the light in this state. Linear polarisers 60, 64 and reflective polariser 62 are oriented so that their respective axes of polarisation are parallel. By applying similar reasoning to that discussed in relation to FIGS. 11*a* and 11*b* as regards the direction of polarisation of the light, it will be understood that the non switched state of cell 28 and valve 30 is totally transparent (FIG. 12*a*), so that dial 18 is visible. Conversely, in the second switched state (FIG. 12*b*), cell 28 behaves like a TN cell and is absorbent in its switched regions, i.e. in the zones in which electrodes 40 and 42 are switched, and valve 30 is totally reflective. Dial 18 is thus masked, and the data appears to observer 70 in a dark colour on a light background, the appearance of the display being determined by the colour reflected by reflective polariser 62. FIG. 12*b* shows that the addressing of the cell is normal, i.e. the switched segments are those which it is sought to display. According to an alternative which is not shown in the drawings, the addressing of the cell can also be reversed, i.e. all the segments are switched with the exception of those which it is sought to display. The data is thus displayed transparently on an opaque background, the appearance of the display being determined by the colour reflected by reflective polariser 62.

According to another alternative, one can select a cholesteric film 50 which reflects a wavelength or a portion of the visible spectrum corresponding to a predetermined colour. In this way one can choose to display the data in a complementary colour to that of the dial, and thus improve the contrast and the aesthetic appearance of the display assembly.

It will also be noted in this regard that, according to another alternative, the TN twisted nematic liquid crystal cell described in the publication by Scheffer can be replaced by a colour display device such as those described in European Patent No. EP-A-0 600 349 which is also incorporated here by reference.

Within the scope of the invention, the switchable reflector is advantageously transparent in the non switched state and reflective in the switched state.

Optical valves 30 which have just been described are all transparent in the non switched state, and can advantageously be combined with cells 28 which are also transparent in a non switched state. Thus, within the scope of the application to a timepiece 1, lower display device 26, namely hands 12, 14 and 16 and dial 18, can be permanently visible with a minimum of energy consumption, to the extent that only lower display device 26 needs to be supplied, upper display device 24 being only supplied when the user wishes to read an item of data supplied by said display device 24.

According to another alternative embodiment, optical valve 30 can be made by means of a switchable cholesteric film which is transparent in a switched state, and opaque and reflective in a non switched state. Such a cholesteric film is for example described in European Patent No. EP-A-0 643 121 which is incorporated here by reference.

In the event that cell 28 is of the scattering type in the switched state (dynamic scattering, nematic gel reverse PDLC type LCD cell), i.e. when it displays an item of data, optical valve 30 can be formed of a liquid crystal cell of the TN, STN, positive contrast GH, ECB, ferroelectric type or of the PSCT (Polymer Stabilised Cholesteric Texture) type or any other cell having a transparent state in the non switched state and opaque or absorbent in the switched state. A cell of the PSCT type is described for example in U.S. Pat. No. 5,437,811.

The display assembly according to the invention thus allows different display configurations to be obtained as a function of the switching state of cell 28 and optical valve 30.

In particular, and with reference to the embodiment of the invention illustrated in FIGS. 1 to 4 in which cell 28 is formed of a TN cell with crossed polarisers and optical valve 30 is formed of an electrolytic cell, lower display device 26 is visible when cell 28 and valve 30 are in the non switched state. In this configuration illustrated in FIGS. 1 and 2, the light, symbolised by a line R1, passes through upper display device 24 and is totally reflected onto dial 18 and hands 12, 14 and 16 to pass again through device 24 without being modified, aside from transmission loss, so that the observer can clearly read the data 1 display by lower display device 26.

Conversely, when cell 28 and valve 30 are in the switched state, lower display device 26 is masked. In this configuration illustrated in FIGS. 3 and 4, the light symbolised by a line R2 passes through cell 28 outside the zones in which electrodes 40 and 42 are switched, and is totally reflected on the surface of valve 30 which is then reflective to pass again through cell 28 and to cause alphanumeric characters 46 (FIG. 4) appear to the observer in a dark colour on a light background, these characters 46 being defined by the zones of cell 28 in which electrodes 40 and 42 are switched. It will be noted that lower display device 26 is totally masked by valve 30 and consequently does not appear to the observer. Any interference between the data displayed by lower display device 26 and upper display device 24 able to alter their legibility is thus avoided.

It will also be noted that cell 28 according to the invention operates in reflective mode by using valve 30 as a reflector which, because of its proximity to cell 28, allows the display of data with an improved contrast.

When cell 28 is in a non switched state and valve 30 is in a switched state, no data is displayed by cell 28 and lower display device 26 is masked by valve 30 as has just been described hereinbefore. In this configuration which is not shown in the drawings, watch 1 does not display any data.

When cell 28 is in a switched state and valve 30 is in a non switched state, the data displayed by lower display device 26 and upper display device 24 is visible. In this configuration shown in FIG. 5, watch 1 displays data respectively from upper display device 24 and lower display device 26 in superposition.

The switching of cell 28 and valve 30 can be achieved in a conventional manner for example via switches controlled by one or more push buttons (not shown in the drawings), each actuation of a push button causing the switching of the cell which is associated therewith from one switched state to another.

What is claimed is:

1. Display assembly including two superposed, respectively upper and lower display devices, characterised in that the upper display device includes a double structure formed of a display cell arranged above an optical valve, said double structure being arranged so that said cell and said valve are transparent in a first state to make the lower display device visible, and that the cell displays an item of data and that the valve is opaque and masks at least partially the lower display device in a second state, control means being provided for supplying a control voltage to the cell and the optical valve to cause them to switch from the first state to the second state and vice versa, wherein the optical valve is formed of a twisted nematic cell, a linear polariser placed in front of the cell, a quarter-wave plate and a cholesteric film having a first helical direction placed in succession behind the cell.

2. Display assembly according to claim 1, characterised in that the cell and the optical valve are in the first transparent state in the absence of any voltage applied by said control means.

3. Display assembly according to claim 1 characterised in that said display cell is a liquid crystal cell selected from cells of the following types: twisted nematic TN, STN, Guest-Host, electrically controlled birefringence (ECB), nematic gel and cholesteric texture, ferroelectric, polymer dispersed liquid crystal.

4. Display assembly according to claim 1, characterised in that the lower display device includes a cholesteric mirror having an opposite helical direction to that of said cholesteric film.

5. Display assembly according to claim 1, characterised in that the lower display device further includes a half-wave plate and a second cholesteric film which is identical to the first.

6. Display assembly according to claim 1, characterised in that the cholestric film is chosen to reflect a wavelength or a portion of the visible spectrum corresponding to a predetermined colour.

7. Display assembly according to claim 1, characterised in that the cell includes, on the side of a crystal, a linear polariser and, on the side of a dial, a reflective polariser, optionally associated with a linear polariser placed in front thereof.

8. Display assembly according to claim 7, characterised in that the display cell and the optical valve are liquid crystal cells of the positive dielectric anisotropy twisted nematic type, said cell being placed between two crossed linear polarisers, and said valve optionally associated with a reflective polariser oriented so that its axis of polarisation is perpendicular to the axis of polarisation of the linear polariser placed in front thereof.

9. Display assembly according to claim 8, characterised in that the addressing of the cell is normal.

10. Display assembly according to claim 8, characterised in that the addressing of the cell is reversed.

11. Display assembly according to claim 7, characterised in that the display cell and the optical valve are each formed by a liquid crystal cell of the negative anisotropy twisted nematic type, and in that the linear polarisers and the reflective polariser are oriented so that their axes of polarisation are parallel.

12. Display assembly according to claim 1, characterised in that the optical valve is formed of an electrolytic cell.

13. Display assembly according to claim 12, wherein the LCD cell is of the nematic gel, dynamic scattering or reverse PDLC type and wherein the valve is of the TN, STN, Guest-Host, electrically controlled birefringence (ECB), ferroelectric type or of the PSCT type.

14. Display assembly according to claim 1, characterised in that the optical valve is formed of a mercury electrocapillary cell.

15. Display assembly according to claim 1, wherein the cell is of the scattering type in the switched state, and wherein the optical valve is formed of a cell having a transparent state in the non switched state and an opaque or absorbent state in the switched state.

16. Display assembly according to claim 1, characterised in that the optical valve is in the first state in the absence of any voltage applied by said control means, and in that the optical valve is formed of a switchable cholesteric film.

17. Display assembly according to claim 1, characterised in that the lower display device is a display device chosen from among the group including an analogue or digital device, or a combination of the latter and a decorative element.

18. Timepiece including a case closed by a crystal and a back cover, a clockwork movement being housed in the case, said movement being associated with a display device of time related information, characterised in that it includes a display assembly according to claim 1, said lower display device being formed by said display device of time related information and said upper display device extending between the crystal and said display device of time related information.

19. Timepiece according to claim 18, characterised in that said display device of time related information includes a dial and an hour hand and a minute hand which move above the dial.

20. Timepiece according to claim 18, characterised in that the crystal is formed by the upper display device.

21. Display assembly including the two superposed, respectively upper and lower display devices, characterised in that the upper display device includes said double structure formed of said display cell arranged above said optical valve, said double structure being arranged so that said cell and said valve are transparent in the first state to make the lower display device visible, and that the cell displays said item of data and that the valve is opaque and masks at least partially the lower display device in the second state, control means being provided for supplying the control voltage to the cell and the optical valve to cause them to switch from the first state to the second state and vice versa, wherein the optical valve is formed of said twisted nematic cell, said linear polariser placed in front of the cell, said quarter-wave plate and said cholesteric film having said first helical direction placed in succession behind the cell, and wherein the upper display device or lower display device further includes a second quarter-wave plate, and the lower display device includes a metal reflector placed behind the second quarter-wave plate.

* * * * *